(12) United States Patent
Maraud et al.

(10) Patent No.: US 6,929,243 B2
(45) Date of Patent: Aug. 16, 2005

(54) BUTTERFLY VALVE

(75) Inventors: Bruno Maraud, Basse Goulaine (FR); Jean Bonnefous, Reze (FR)

(73) Assignee: Defontaine (FR)

( * ) Notice: Subject to any disclaimer, the term of this patent is extended or adjusted under 35 U.S.C. 154(b) by 29 days.

(21) Appl. No.: 10/416,604

(22) PCT Filed: Sep. 16, 2002

(86) PCT No.: PCT/FR02/03150
§ 371 (c)(1),
(2), (4) Date: Sep. 8, 2003

(87) PCT Pub. No.: WO03/025440
PCT Pub. Date: Mar. 27, 2003

(65) Prior Publication Data
US 2004/0026650 A1 Feb. 12, 2004

(30) Foreign Application Priority Data
Sep. 17, 2001 (FR) .............................. 01 12008

(51) Int. Cl.$^7$ ................................................. B65B 1/04
(52) U.S. Cl. ...................................................... 251/305
(58) Field of Search ................................. 251/305–308

(56) References Cited

U.S. PATENT DOCUMENTS

| | | | | |
|---|---|---|---|---|
| 2,095,263 A | * | 10/1937 | Moss ........................... 251/283 |
| 3,485,476 A | * | 12/1969 | Hemphill ..................... 251/283 |
| 3,945,398 A | * | 3/1976 | Masheder ................. 137/527.8 |
| 5,102,097 A | * | 4/1992 | Davis et al. ................. 251/283 |
| 5,465,756 A | * | 11/1995 | Royalty et al. ......... 137/625.31 |
| 6,047,950 A | * | 4/2000 | Pontoppidan et al. ....... 251/305 |

* cited by examiner

Primary Examiner—Steven O. Douglas
(74) Attorney, Agent, or Firm—Bachman & LaPointe, P.C.

(57) ABSTRACT

The butterfly valve comprises a disk which is provide with at least one protuberance over at least a portion of at least one of its faces. Quite unexpectedly, the use of such a disk makes it possible to improve considerably the quality of the cleaning of the valve and to reduce the time required for cleaning operations.

10 Claims, 1 Drawing Sheet

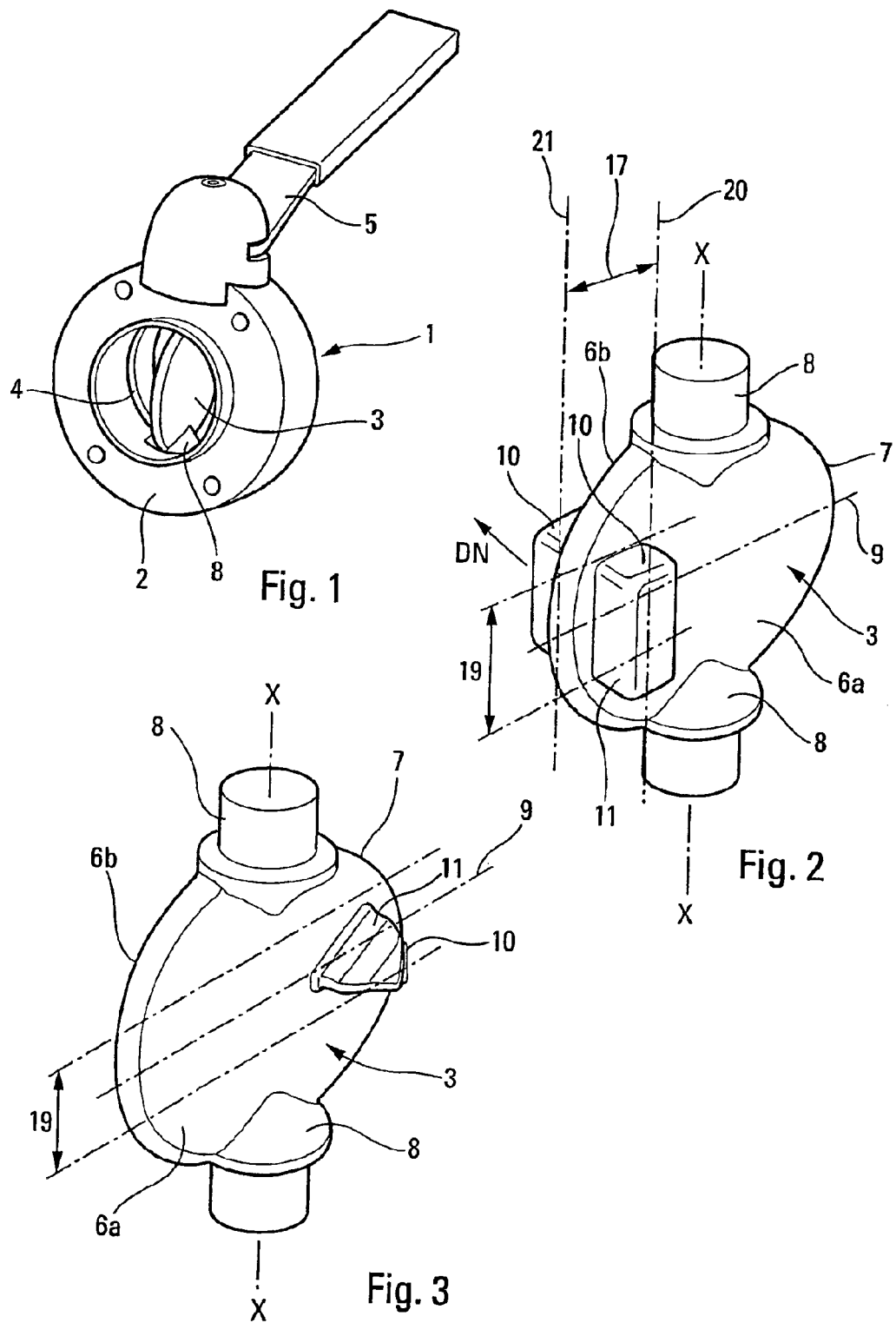

BUTTERFLY VALVE

BACKGROUND OF THE INVENTION

The present invention relates to a butterfly valve.

In the food industry, the cleanness of the pipes through which liquid food (milk, creams, etc.) flows is of great importance.

Deposits of impurities gradually build up along the pipes, in particular at the valves. It is therefore necessary to clean the pipes correctly in order to prevent bacteria from appearing, such cleaning being achieved without disassembling the pipes, by causing a cleaning liquid to flow through them, which cleaning liquid must not be too aggressive, as is bleach, so as to avoid damaging the gaskets and the stainless steel walls.

It is known that butterfly valves are valves of simple and inexpensive design. Unfortunately, they suffer from the drawback of being difficult to clean, especially where the disk is connected to the cylinder of the valve, in the vicinity of its pivot axis.

Because of that drawback, and in order to ensure that the operations for cleaning butterfly valves in place are effective, the time for which the cleaning fluid is caused to flow must be increased considerably, and certain users even prefer not to use such valves and to replace them with flap valves.

The problem to be solved is how to make a device that makes it possible to increase the effectiveness and the quality of cleaning of the butterfly valves in place, such cleaning being achieved by causing fluid to flow, so as firstly to comply with safety and hygiene standards, and secondly to reduce the time required by the cleaning operations and therefore their cost.

SUMMARY OF THE INVENTION

The solution proposed is a butterfly valve having a disk mounted to turn about a pivot axis and provided with at least one protuberance situated on at least one of its faces and downstream from the pivot axis of the disk when said disk is in the open position.

Quite unexpectedly and surprisingly, the use of such a disk makes it possible to improve considerably the quality of the cleaning of the valve and to reduce the time required by the cleaning operations, whereas the person skilled in the art is dissuaded from using such a solution which increases the head loss of the circuit and which goes against what a hydraulics specialist always seeks to achieve, namely a circuit with as little head loss as possible.

Even in the open position, a disk is an obstacle to good fluid flow: therefore, in the vicinity of said disk, vortices and cavitation phenomena are generated, mainly where the disk is connected to the cylinder of the valve, close to the pivot axis.

The quality of the cleaning depends on three main factors: a thermal factor, a chemical factor (the components of the cleaning fluid reacting chemically with the zones to be cleaned), and a physical factor (friction of the cleaning fluid against the zones to be cleaned).

The presence of vortices and of cavitation phenomena generate local lower-pressure zones mainly downstream from the pivot axis where the cylinder is connected to the disk, thereby slowing down the flow of the fluid in those zones.

Thus, the physical action of the cleaning fluid is reduced considerably in these lower-pressure zones. As a result, as the production and cleaning cycles progress, dirt builds up on the walls of the pipe, thereby encouraging the proliferation of bacteria.

Contrary to the principles of rheology, whereby it is essential to minimize the head loss in a pipe, the solution proposed consists in incorporating a protuberance into the disk, which increases the head loss of the valve.

However, because of the protuberance and of the preferred implementations for its position and for its shape, the flow and the trajectory of the fluid, and the vortices are modified downstream from the pivot axis. Thus, the zones where the disk is connected to the cylinder, which zones are sites on which dirt tends to build up, are no longer swept by streams that are too gentle, but rather by streams that are much more vigorous and more uniform, thus making the zones much easier to clean. It is therefore possible to reduce the time required for valve cleaning operations.

BRIEF DESCRIPTION OF THE DRAWINGS

Other features of the invention appear from the following description.

In the accompanying drawing given by way of non-limiting example:

FIG. 1 is a perspective view of a butterfly valve;

FIG. 2 is a perspective view of a first embodiment of a butterfly valve disk of the present invention; and FIG. 3 is a perspective view of a second embodiment of a butterfly valve disk of the present invention.

DETAILED DESCRIPTION OF THE PREFERRED EMBODIMENT(S)

As can be seen in FIG. 1, a butterfly valve 1 has a cylinder 2 inside which a fluid flows, a substantially flat disk 3 which is mounted to turn about a pivot axis X—X, and which, by turning, makes it possible to control flow of the fluid, a gasket 4 suitable for providing sealing on either side of the disk 3 when said disk is in the closed position, and a drive member 5 enabling the user to cause the disk 3 to open inside the cylinder 2.

The disk 3 is defined firstly by its two faces 6a, 6b, and secondly by its periphery 7 which corresponds substantially to the cross-section through which the fluid flows inside the cylinder 2.

The intersection between the pivot axis X—X of the disk 3 and the periphery 7 of the disk 3 defines two stub axles 8 via which the disk 3 is mounted to pivot in the cylinder 2. The axis that is perpendicular to the pivot axis X—X, that is situated in the plane of the disk 3, and mid-way between the two stub axles 8 is referred to below as the "equatorial axis" 9.

In the invention, the disk 3 is provided with at least one protuberance 10 on at least one of the two faces 6a, 6b of the disk 3: in the example shown in FIG. 2, both faces 6a, 6b have protuberances 10, whereas, in the example shown in FIG. 3, only one of the faces has a protuberance 10.

In the examples shown in FIGS. 2 and 3, the protuberances 10 are situated in the vicinity of the periphery 7 of the disk 3. More precisely, in these examples, the protuberances 10 are situated in the vicinity of the equatorial axis 9 and in the vicinity of the periphery 7 of the disk 3.

The presence of the protuberances 10 makes it possible to modify the rheology of the fluid, in particular in the vicinity of the two stub axles 8.

Positioning the protuberances 10 in the vicinity of the equatorial axis 9 makes it possible to deflect the fluid towards the two stub axles 8 particularly effectively by increasing the speed at which the fluid flows along the zones of the walls that are situated downstream from the stub axles 8, and by moving the vortices away from the equatorial axis 9. The quality of cleaning is thus improved by better physical action from the fluid.

In one particular embodiment, the protuberances 10 are placed downstream from the pivot axis X—X of the disk 3 when said disk is in the open position.

This embodiment is particularly advantageous, especially when the protuberance 10 is situated in the vicinity of the equatorial axis 9 and in the vicinity of the periphery 7 of the disk 3 because the vortices generated by the disk 3 and by the protuberance 10 are situated downstream from the protuberance 10, and therefore downstream from any portion of the disk 3 and of the valve 1, inside the pipe.

Thus, not only the zone in the vicinity of the two stub axles 8 but also the entire disk 3 is no longer immersed in vortices having slow flow speeds, which facilitates cleaning. The vortices generated by the protuberance 10 are situated well downstream from the valve 1 on which the deposits to be removed are situated.

To be particularly effective, the protuberance 10 must have at least a minimum dimension in the direction DN normal to the faces 6a, 6b of the disk 3. This dimension, referred to as "height" below, must be large enough to deflect the flow of the fluid towards the zones of the walls of the pipe that are situated downstream from the two stub axles 8. Said height is easy for the person skilled in the art to determine. For example, for water flowing at a flow rate of 50 cubic meters per hour ($m^3/h$) in a pipe having a diameter of 50 millimeters (mm), the height must be at least 18 mm.

In the example shown in FIG. 2, the protuberance 10 is substantially in the shape of a rectangular block, the base of the protuberance being rectangular in shape, whereas, in the example shown in FIG. 3, the protuberance is substantially in the shape of a truncated pyramid, the base of the protuberance 10 being triangular in shape and having one of its angles oriented towards the center of the disk 3.

The side surface 11 of the protuberance 10 co-operates with that face 6a, 6b of the disk 3 which supports it to form an angle of no less than 450. In this way, the change of slope between the protuberance and the face of the disk generates a major vortex effect. The side surface 11 of the protuberance 10 shown in FIG. 2 forms an angle substantially equal to 900 with the face 6a, 6b that supports it, and the side surface of the protuberance 10 shown in FIG. 3 forms an angle substantially equal to 60°.

More precisely, the protuberance 10 is preferably situated within an equatorial strip 19 parallel to the equatorial axis 9, centered relative to said equatorial axis 9, and whose width is substantially equal to one third of the diameter of the disk 3.

The protuberance 10 is preferably situated in the peripheral zone 17 that corresponds to the zone defined on one side by the normal 21 to the equatorial axis 9 that is tangential to the periphery 7 of the disk 3, and on the other side by the mid-line 20 situated between the normal 21 and the pivot axis X—X.

Similarly, in order to have a good vortex effect downstream from the pivot axis X—X on the walls of the pipe that are situated in the same plane as the stub axles 8, the height of the protuberance 10 must preferably be not less than one fourth, or even one third, of the diameter of the disk 3 (which corresponds to the diameter of the pipe).

Such a disk is particularly well adapted to generating a considerable vortex flow downstream from the pivot axis X—X and thus to cleaning the pipe, even in the same plane as the stub axles 8 of the disk 3, downstream from them.

Naturally, the invention is not limited to the above-described embodiments.

It is possible to use a disk 3 on which the protuberances 10 are of shape different from the shapes shown in FIGS. 2 and 3, or a disk 3 having a plurality of protuberances 10 on each face 6a, 6b.

What is claimed is:

1. A butterfly valve comprising:
   a cylinder, a disk which is mounted to turn about a pivot axis with respect to the cylinder and which is provided with at least one protuberance on at least one face, and a drive member for operating said disk;
   said at least one protuberance being shaped for deflecting fluid towards zones where the disk and the cylinder intersect and for generating, downstream and in the vicinity of the zones, vigorous and uniform vortex flows.

2. The butterfly valve according to claim 1, wherein said at least one protuberance has a height which is not less than one fourth of a diameter of the disk.

3. The butterfly valve according to claim 1, wherein said at least one protuberance has a side surface which operates with said at least one face of the disk which supports said at least one protuberance to form an angle of not less than 45 degrees.

4. The butterfly valve according to claim 1, wherein said at least one protuberance is situated downstream from the pivot axis of the disk when said disk is in the open position.

5. The butterfly valve according to claim 1, wherein the at least one protuberance is situated in a vicinity of a periphery of the valve.

6. The butterfly valve according to claim 1, wherein the at least one protuberance is situated in a vicinity of an equatorial axis of the disk, said equatorial axis is perpendicular to said pivot axis and is mid-way between two stub axles via which the disk is mounted in the cylinder of the valve.

7. The butterfly valve according to claim 6, wherein the at least one protuberance is situated in an equatorial strip which is parallel to said equatorial axis, which is centered relative to said equatorial axis, and whose width is substantially equal to one third of a diameter of the disk.

8. The butterfly valve according to claim 6, wherein the at least one protuberance is situated in a peripheral zone defined on one side by a normal to the equatorial axis that is tangential to a periphery of the disk and on the other side by a mid-line situated between the normal and the pivot axis.

9. The butterfly valve according to claim 1, wherein a base of the at least one protuberance is rectangular in shape.

10. The butterfly valve according to claim 1, wherein a base of the at least one protuberance is triangular in shape.

* * * * *